United States Patent [19]
Fox et al.

[11] Patent Number: 5,215,769
[45] Date of Patent: Jun. 1, 1993

[54] CALCIUM FORTIFIED DRESSING SALAD PRODUCT

[75] Inventors: Mary M. Fox, Fairfield, Ohio; Kenneth R. Luhrsen, Aurora, Ind.; Alice L. Burkes, Cincinnati, Ohio

[73] Assignee: The Procter & Gamble Company, Cincinnati, Ohio

[21] Appl. No.: 928,550

[22] Filed: Aug. 13, 1992

Related U.S. Application Data

[63] Continuation of Ser. No. 606,211, Oct. 31, 1990, abandoned.

[51] Int. Cl.$^5$ ............................................. A23L 1/304
[52] U.S. Cl. ........................................ 426/74; 426/601; 426/605; 426/804
[58] Field of Search ............... 426/605, 601, 611, 804, 426/17, 74

[56] References Cited

U.S. PATENT DOCUMENTS

| | | | |
|---|---|---|---|
| 2,916,384 | 12/1959 | Bondi | 426/804 |
| 3,600,186 | 8/1971 | Mattson | 426/804 |
| 3,843,805 | 10/1974 | Powell | 426/638 |
| 3,955,010 | 5/1976 | Chozianin | 426/605 |
| 4,140,808 | 2/1979 | Jonson | 426/804 |
| 4,336,272 | 6/1982 | Verreps | 426/605 |
| 4,423,084 | 12/1983 | Trainor | 426/605 |
| 4,551,342 | 11/1985 | Nakel et al. | 426/548 |
| 4,626,443 | 12/1986 | Takahashi | 426/804 |
| 4,722,847 | 2/1988 | Heckert | 426/74 |
| 4,737,375 | 4/1988 | Nakel et al. | 426/590 |
| 4,786,510 | 11/1988 | Nakel | 426/74 |
| 4,830,862 | 5/1989 | Braun et al. | 426/74 |
| 4,840,815 | 6/1989 | Meyer | 426/804 |
| 4,927,657 | 5/1990 | Antaki et al. | 426/589 |
| 4,940,601 | 7/1990 | Orphanos | 426/804 |
| 4,942,054 | 7/1990 | Winter | 426/804 |
| 4,960,602 | 10/1990 | Talkington | 426/611 |
| 4,973,489 | 11/1990 | Meyer | 426/804 |

FOREIGN PATENT DOCUMENTS

| | | | |
|---|---|---|---|
| 482764 | 4/1975 | Australia | 426/804 |
| 301653 | 2/1989 | European Pat. Off. . | |
| 304986 | 3/1989 | European Pat. Off. . | |
| 0375031 | 6/1990 | European Pat. Off. | 426/804 |
| 375239 | 6/1990 | European Pat. Off. . | |
| 3211681 | 10/1983 | Fed. Rep. of Germany | 426/74 |
| 56-097248 | 8/1981 | Japan . | |
| 2-109956 | 4/1990 | Japan | 426/804 |
| 2-227048 | 9/1990 | Japan | 426/74 |

OTHER PUBLICATIONS

Gupta 1983 JAOCS 60(4) 862–869.
Berner 1990 Calcium and Chronic Disease Prevention: Challenges to the Food Industry Food Technology Mar. issue p. 50.
Derwent Publications, World Patent Index, Section CH, week 7739, 1977 of JA 52,009,294 (Aug. 19, 1977).
Derwent Publications, World Patent Index, Section CH, week 8146, 1981 Abstract of SU 805,986 (Feb. 23, 1981).
Derwent Publications, World Patent Index, Acc No. 48879C of Japan 55,071,476 (Nov. 24, 1978).
Derwent Publications, World Patent Index, Section CH, week 7909, 1979 of Japan 54,008,767 (Jan. 23, 1979).
Derwent Publications, World Patent Index, Section CH, week 8746, 1987 of Japan 58,081,758 (May 17, 1983).

Primary Examiner—Carolyn Paden
Attorney, Agent, or Firm—Rose A. Dabek; Jerry J. Yetter; Eric W. Guttag

[57] ABSTRACT

This invention relates to sauces and salad dressings containing a soluble calcium source comprising specific molar ratios of calcium, citrate and malate or calcium acetate. The calcium composition is more soluble in these products than calcium citrate or calcium carbonate. The calcium citrate malate consists of a metastable complex salt. A calcium fortified vinegar is also disclosed.

26 Claims, No Drawings

CALCIUM FORTIFIED DRESSING SALAD PRODUCT

This is a continuation of application Ser. No. 07/606,211, filed on Oct. 31, 1990, now abandoned.

TECHNICAL FIELD

This invention relates to sauces and salad dressings containing a soluble calcium source comprising specific molar ratios of calcium, citrate and malate or calcium acetate. The calcium citrate malate composition is more soluble than calcium citrate or calcium carbonate, and consists of a metastable complex salt.

BACKGROUND OF THE INVENTION

Calcium is a mineral that is important for building bones and teeth. One of the problems with supplementation of the diet with calcium is that all sources of calcium are not equally soluble or bioavailable. In addition, some calcium sources are not as pure as other sources. For example, calcium carbonate derived from bone meal, oyster shell, or other biological origins contains trace amounts of lead and other minerals. Some calcium carbonates also contain silica. Therefore, it is necessary to take additional amounts of these materials to achieve the same calcium level as those taken from synthetic sources which are essentially pure calcium carbonate.

Calcium citrate is poorly soluble in water; calcium malate is more soluble. Calcium hydroxide is somewhere in between these salts. The hydroxide absorbs carbon dioxide from the air readily forming calcium carbonate. Calcium salts readily hydrate even when stored in dry cool places. Therefore, the amount of calcium being delivered by any pill or preparation may be even less than expected because of the large amount of water absorbed by the salts.

Calcium salts are more soluble in acid matrices than in neutral solutions. However, even under acid conditions, the solubility of many calcium salts is limited. It has been found that the preferred calcium citrate malate used herein is readily soluble and bioavailable, even under neutral conditions. Also, because of this solubility and because of the microcrystalline form of the calcium citrate malate used herein, it does not produce a gritty taste in sauces.

U.S. Pat. No. 3,955,010 to Chozianin et al, issued May 4, 1976. discloses emulsified oil dressing products such as mayonnaise, salad dressing, and french dressing where the fat component is based on a standard triglyceride fat or oil. Salad dressings are defined as emulsified foods prepared from an edible vegetable oil, and acidifying ingredients such as vinegar, lemon juice or lime juice, and egg yolk containing ingredients in a cooked or partially cooked starch paste prepared from food starch, tapioca flour, wheat flour, rye flour, or combinations of these starchy materials and water.

U.S. Pat. No. 4,140,808 to Jonson, issued Feb. 20, 1979, discloses low calorie mayonnaise and dressing-type products which comprise oil, egg yolk vinegar, mustard and spices. This patent teaches that industrially manufactured products of this type also contain acetic acid, sugar, salt, thickener, preservatives, and dyes. Among the suitable thickeners listed are starch and chemically modified starches.

The present invention relates to emulsified oil dressing products, in particular salad dressing products, which are calcium fortified, yet have the desired consistency and texture of mayonnaise products. It also relates to the vinegar preparations used to make these products.

In addition to its use in bone building, calcium has also been known to form insoluble salts or soaps with long chain fatty acids. When fat is metabolized fatty acids are formed in the gut. Recently it has been discovered that if there are calcium ions available, then these saturated long chain fatty acids can form insoluble calcium soaps and thus not be absorbed. Therefore, a sauce or other emulsified oil dressing which contains high levels of available, soluble calcium which could be used in conjunction with beef and other saturated fat containing foods, would be useful because the amount of fat absorbed from the food would be decreased.

Accordingly, it is an object of this invention to provide a readily available calcium source which can be used as a nutritional supplement for building bones, strong teeth, and in general supplementing the daily requirement of calcium in the form of a sauce or emulsified dressing or a vinegar.

It is a further object of this invention to provide a method of decreasing the fat absorbed from meats, and other fat containing foods by serving a calcium fortified sauce with the food product.

These and other objects will become apparent from the descriptions herein.

BACKGROUND ART

Japanese patent application Sho 56/097,248 (Tanaka, 1981) discloses a calcium citrate malate salt of increased solubility. This salt is a 5:2:2 ratio of calcium:citrate:malate, formed by mixing calcium carbonate with citric and malic acids in water at 50° C. to 60° C. and separating the white crystalline material from the mother liquor. When the product is dry (oven drying is used), the temperature is raised to 110° C. –120° C. to sterilize the powder.

Calcium citrate malate has been made in beverages. U.S. Pat. No. 4,737,375 issued to Nakel et al describes beverages nutritionally supplemented with calcium to which citric and malic acids are added.

U.S. Pat. No. 4,722,847 issued to Heckert (1988) describes calcium citrate malate in beverages and the preparation of the material in a beverage format.

In Japan a honey flavored vinegar drink fortified with calcium citrate malate is sold.

SUMMARY OF THE INVENTION

An emulsified oil dressing comprising:
a) from about 0.5% to about 10% of a calcium source selected from the group consisting of calcium carbonate, calcium oxide or calcium hydroxide with citric and malic acids, wherein the molar ratio of calcium is from 2 to 8 and the molar ratio of citrate is from 1 to 3 and the molar ratio of malate ranges from 1 to 5, calcium acetate and mixtures thereof;
b) a sufficient amount of an acidic acid component to lower the pH to from about 3.5 to about 4.5;
c) from about 0.5% to about 10% thickening agent; and
d) from about 5% to about 60% fat is disclosed.

An emulsified oil dressing comprising:
a) from about 0.5% to about 10% of a calcium source selected from the group consisting of calcium carbonate, calcium oxide or calcium hydroxide with citric and malic acids, wherein the molar ratio of calcium is from 2 to 8 and the molar ratio of citrate is from 1 to 3 and the molar ratio of malate ranges from 1 to 5, calcium acetate and mixtures thereof;
b) a sufficient amount of an acidic acid component to lower the pH to from about 3.5 to about 4.5;
c) from about 0.5% to about 10% of a protein; and
d) from about 5% to about 60% fat is also claimed.

A vinegar comprising:
a) from about 0.5% to about 10% of a calcium source selected from the group consisting of calcium carbonate, calcium oxide or calcium hydroxide with citric and malic acids, wherein the molar ratio of calcium is from 2 to 8 and the molar ratio of citrate is from 1 to 3 and the molar ratio of malate ranges from 1 to 5, or calcium acetate;
b) from 0.001 to 1.0% flavor;
c) from about 1.0% to 12.0% acetic acid; and
d) from 83% to 98.5% water is also disclosed.

All percentages and proportions used herein are by weight unless otherwise specified.

As used herein, the term "comprising" means various components can be conjointly employed in the emulsified oil dressing products of the present invention. Accordingly, the term "comprising" encompasses the more restrictive terms "consisting essentially of" and "consisting of."

DETAILED DESCRIPTION OF THE INVENTION

Emulsified oil dressings typically refer to three generally recognized types of dressings: mayonnaise, salad dressing, and French dressing. Mayonnaise is an emulsified semi-solid food prepared from vegetable oil(s), one or more acidifying ingredients, one or more egg yolk-containing ingredients or emulsifiers, as well as other optional ingredients such as salt, sweeteners, spices, monosodium glutamate, sequestrants, etc. Mayonnaise, by definition contains, not less than 65% by weight vegetable oil, although most commercial mayonnaise products contain approximately 80% by weight vegetable oil. Because of this relatively high level of oil, mayonnaise products are relatively high in calories, and often in saturated fats. Sandwich dressings or sauces are mayonnaise based, e.g. tartar sauce and thousand island dressing.

A lower calorie version of emulsified oil dressing products are salad dressings. Salad dressings are often similar to mayonnaise in consistency and texture (e.g. spreadability but can be pourable) and contain not less than 30% by weight vegetable oil. Most commercial salad dressing products contain approximately 45% by weight vegetable oil, or about one-half that of most commercial mayonnaise products. Salad dressings differ from mayonnaise also in the fact that they contain a thickening agent which is a starchpaste component. The thickening agent provides the consistency and texture that would be missing as the result of the lower vegetable oil level. Because of this reduction in the level of vegetable oil, salad dressings are less caloric than mayonnaise. Salad dressings include both pourable and spreadable products.

A. Calcium Citrate Malate

The products herein are illustrated with calcium citrate malate but calcium acetate can be used herein at equivalent calcium levels. As used herein the term, "calcium citrate malate" refers to a mixture of calcium, citrate and malate. It is referred to as CCM. The specific ratios will be defined as the ratio of calcium to citrate to malate. All ratios of calcium, citrate and malate are on a mole basis. The less calcium present in this molar ratio the higher the solubility of the resultant powder. The molar ratio of calcium in the salts is from 2 to 8, the molar ratio of citrate ranges from 1 to 3 and the molar ratio of malate ranges from 1 to 5, the calcium to citrate to malate can range from 2:1:1 to 8:2:1. Preferred ratios are 6:2:3 and 4:2:3, but other ratios can be used. A calcium:citrate:malate mixture of 6:2:3 represents a form in which all of the carboxylic acid groups of citric and malic acid are neutralized with the calcium. The 4:2:3 product is acidic.

As used herein, the term "malic acid" refers to the mixture of the D and the L isomers, i.e. malic acid is optically active and the racemic mixture is used herein.

As used herein the term "metastable" means that the material is not at equilibrium, and is a mixture of various crystalline and non-crystalline forms and solid solutions of the calcium ions, citrate ions and malate ions as well as salts of these materials. The reaction kinetics would indicate that the calcium neutralizes all of the acid groups of citric and malic acid, or partially neutralizes depending on the ratio of the calcium to citric acid to malic acid. But rather, a metastable state established between the ions and, when prepared by the process herein, a complex salt is formed. This complex salt is distinct from pure calcium citrate or pure calcium malate or simple mixtures thereof. The salt may be crystalline or micro crystalline, but may also represent an amorphous form or may contain solid solutions of calcium, citrate and malate ions.

The metastable materials probably have more than 1 crystalline state reflected by the presence of multiple hydration states. In addition, there are likely to be significantly different arrangements of the citrate and malate within the material. The physical and chemical data of these materials are consistent with the theory that there are non-crystalline regions within the powdered material which can hydrate to the point of behaving like a solution. It is important for the solubility characteristics of the calcium citrate malate that the apparent metastable complex be achieved.

Therefore, while the X-ray diffraction pattern indicates that there is some crystallinity, and that this material is different from calcium citrate or calcium malate, the exact structure of the material is not known.

The calcium citrate malate is prepared by adding calcium carbonate to an aqueous solution of citric acid and malic acid in the mole ratio necessary to make the desired calcium citrate malate material. When calcium carbonate is used, carbon dioxide evolves as the calcium carbonate is neutralized by the citric and malic acids. The reaction is stirred until the carbon dioxide stops evolving and it appears that the material has been neutralized. It should be recognized that not all of the carbon dioxide evolves; some will dissolve in the water. When calcium oxide, or other source of calcium is used, the material is stirred until the acids have been neutralized by the calcium.

The malic acid can be in solution and the citric acid and calcium source added to it simultaneously. However, the concurrent addition of calcium and citrate ion, i.e. as a mixture, is not preferred since calcium citrate forms readily and can precipitate. The addition of one of the acids to a calcium salt of the other in water is also not preferred. This causes a calcium citrate malate composition to be formed which is not as soluble as the metastable complex prepared when calcium is added to a citric and malic acid solution.

Calcium carbonate can be used as the calcium source. Other sources include calcium oxide and calcium hydroxide. Calcium chloride, calcium phosphate and calcium sulphate are suitable for use herein, but their use is limited because the anions make an acid solution, i.e. hydrochloric acid, sulfuric and phosphoric acid, respectively, which can adversely affect the flavor of the calcium citrate malate.

A solid forms during the mixing of the calcium oxide or calcium hydroxide with the citric and malic acid. When these materials are used, it is necessary to mix the solution until all of the calcium appears to have dissolved. The calcium citrate malate complex will precipitate when its solubility is exceeded.

The preferred method of preparation is to prepare a highly concentrated solution of the calcium citrate malate which quickly and efficiently forces metastable calcium citrate malate out of solution. Concentrations of from 20% to 75% (weight percent of reactants) are preferred. Preferably the concentration is from 40% to 65% weight of reactants.

The reaction temperature can be ambient (20° C.) or higher. Preferably the temperature of the reaction is in the range of 30° C. to 80° C. Most preferably it is from 40° C. to 60° C.

This total mixture, which contains a supernatant calcium citric and malic acid solution as well as a solid can be dried. The solid can also be removed from the supernatant solution by filtration, centrifugation, or decantation and then the solid dried.

Drying can be done by forced air drying, convection drying, oven drying, freeze drying or spray drying. No matter what form of drying is used, the temperature of the drying should be less than 100° C. Above 100° C., the calcium citrate malate decomposes. When it decomposes, a less soluble mixture is made and the ratio of calcium to citric and malic acid is changed.

Preferably, when using forced air drying, the drying is accomplished on a thin layer of product at between 60° C. and 85° C. The product is layered to between 0.05 inches and 0.5 inches thick.

In spray drying, the solution and solid mixture is sprayed into a hot air column at 60° C. to 85° C. The pressure in the column is 600 to 900 millimeters of mercury.

Vibratory freeze drying, or other conventional freeze drying techniques can also be used. The mixture is placed on a tray at a thickness of from about 0.01 inch (0.25 cm) to about 1 inch (2.5 cm) and frozen. A vacuum of 0.01 to 1 millimeters of mercury is used and a temperature of less than 25° C. is maintained during the freeze drying operation. The material is dried until the amount of free or unbound water is less than 5%.

When forced air drying or freeze drying is used, the dried material is ground using any conventional grinding equipment, including a ball mill and then sieved to a particle size of less than 1 millimeter. This particle size makes it easier to dissolve. Grinding and sieving should be done under anhydrous conditions or at low humidities to keep the metastable calcium citrate malate from rehydrating or absorbing water. These same methods can be used to grind the calcium acetate.

The particle size of the CCM powder can be from 6-50 microns however, the desired particle size of the CCM powder is from 20-12 microns.

The ratio of calcium to citric acid to malic depend upon the reactants used and whether the entire solution, including the supernatant liquid, is dried. In making calcium salts of the type 6:2:3, 8:2:5 and 6:3:4, it is important to include the supernatant in the material to be dried since lower ratio salts could drop out of solution. The exact formula for the salts can be derived by measuring the percent of calcium, and the percentage of citric and malic acid in the solid material. It is important to remember that water content also has to be analyzed since these materials readily form hydrate salts. The calcium level can be determined by atomic absorption measurements.

The preferred salts for solubility and therefore for bioavailability are the neutral and acidic salts. Neutral metastable calcium citrate malate compositions having the formula:

$3x + 2y = 2z$ wherein x is the moles of citrate, y is the moles of malate and z is the moles of calcium. When 2z is greater than 5, these metastable compositions exhibit enhanced solubility and functionality. The 6:2:3 salt is more soluble than 5:2:2 and other neutral salts have shown even better solubility. The ratios derived from this formula are expressed as integers and the ratio is reduced to the lowest common denominator. For example, 12:4:6=6:2:3; 6:2:3 is not expressed as 3:1:1.5.

The enhanced solubility of these salts is unexpected since one would not expect the anions and the ratio of calcium to anions to play such a key role in solubility. Table I lists the preferred neutral salts and their solubility expressed as calcium in solution per weight of calcium citrate malate used. The exact method for determining this is described hereinafter.

TABLE I

| Calcium Citrate Malate | Class | % Ca w/w CCM Solubility |
|---|---|---|
| 6:2:3 | Neutral | 91 |
| 5:1:1 | Basic | 45 |
| 5:2:2 | Neutral | 73 |
| 8:2:5 | Neutral | 89 |
| 4:2:3 | Acid | 100 |

The acidic salts, those wherein the levels of citric and malic acids is greater than the level of calcium $3x + 2y > 2z$ are also more soluble and therefore preferred compositions in terms of solubility and bioavailability.

The basic materials, i.e. those in which calcium is in excess $(3x + 2y < 2z)$, are not preferred. These tend to be less soluble (see Table I) and also contain excess amounts of calcium starting material. The method of solubility used to determine the data in Table I, is described in the Analytical Methods section below. Using this method, calcium carbonate has a solubility of 0 and calcium citrate is 13, whereas calcium malate is 66.

The calcium citrate malate prepared by this method represents a soluble form of calcium, which is considerably more soluble than calcium citrate, calcium malate, or calcium carbonate. In addition, the calcium citrate malate is considerably more soluble in dilute acid solutions.

For example, a 6:2:3 calcium citrate malate solid is more soluble in either 1% or 10% acetic acid at a concentration of 500 milligrams of calcium per 50 milliliters (ml) of water than calcium citrate or calcium malate.

B. Fat Component

An important component of the emulsified oil dressing products of the present invention is the fat component. The emulsified oil dressing products of the present invention can comprise from about 30 to about 65% fat component. Preferred emulsified oil dressing products comprise from about 40 to about 50% fat component.

The fat component of these emulsified oil dressing products comprises a triglyceride oil, or fat which can be natural or synthetic, or a low calorie fat. Low calorie fat materials and triglyceride oil can be used together to provide reduced calorie benefits, as well as desirable consistency and texture in the product. When a lower calorie product is desired from about 50 to about 90% low calorie fat material can be used as the fat component with the triglyceride oil, preferably from about 60 to about 70% low calorie fat material and from about 30 to about 40% triglyceride oil are used.

As used herein, the term "triglyceride oil" refers to those triglyceride oils which are fluid or liquid above about 15° C. The triglyceride oil useful as the fat components of the present invention can include mixtures of liquid oils with solid triglycerides. These triglyceride oils consist primarily of triglyceride materials, but can also include residual levels of other components such as mono- and diglycerides. To remain fluid or liquid at temperatures below 15° C., the triglyceride oil contains a minimum amount of glycerides having melting points higher than about 15° C. so as to limit the solids increase when the triglyceride oil is cooled. It is desirable that the triglyceride oil be chemically stable and resistant to oxidation.

By "low calorie fat materials" is meant edible materials which can replace triglyceride fats or oils in the human diet. These materials provide the benefits of triglyceride fats and oils, i.e., lubricity and flavors.

By "wholly nondigestible" is meant that substantially all of the low calorie fat material is not digested by the body. It passes through the digestive system substantially the same as when it was ingested. The term "partially nondigestible" means that at least about 30% of the low calorie fat material is not digested. Preferably at least about 70% of the low calorie fat material is not digested.

By "liquid/solid stability" as used herein is meant that the liquid portion of the low calorie fat material does not readily separate from the solid portion at body temperature, i.e., the low calorie fat material appears to be a solid even though up to 95% or more of it is liquid. Liquid/solid stability can be measured by centrifuging a sample of the material at 60,000 rpm for one hour at 100° F. (37.8° C.). Liquid/solid stability is defined as: 100% minus percentage of the low calorie fat material that separated as a liquid after centrifuging.

Suitable triglyceride oils can be derived from naturally occurring liquid vegetable oils such as cottonseed oil, soybean oil, safflower oil, corn oil, olive oil, coconut oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids need some hydrogenation to maintain flavor, but care should be taken not to greatly increase the amount of glycerides melting above 15° C. When oils are selected which have a larger amount of solids melting between 15° and 40° C. than are desirable, it can be necessary to separate out the solids. For example, refined and slightly hydrogenated soybean oil is suitable, as well as refined cottonseed oil.

Triglyceride oils useful in the fat component of the present invention can include certain triglycerides in which one or two of the OH groups of the glycerol molecule have been replaced by acetyl, propionyl, butyryl, or caproyl radicals, and one or two of the remaining OH groups of the glycerol molecule have been replaced by acyl radicals of higher molecular weight saturated or unsaturated fatty acids having from 12 to 22 carbon atoms. For the purposes of the present invention, these glycerides containing both high and low molecular weight acid radicals are referred to as low molecular weight synthetic fats. The low molecular synthetic fats selected should be fluid or liquid at 15° C. In order to resist oxidation and to prevent rancidity, it is preferred to select low molecular synthetic fats in which there are a minimum of carbon-to-carbon double bonds in the higher molecular weight fatty acid radicals, and preferably not more than two double bonds in any single acid radical. Normally liquid fatty acids of the oleic acid series, having a single carbon-to-carbon double bond, are ideal for this purpose.

As discussed above, the preferred low calorie fat materials have a high liquid/solid stability inasmuch as the liquid portion of the fat materials does not readily separate from the solid portion. At 100° F. (37.8° C.), the low calorie fat materials have a liquid/solid stability of at least about 30%, preferably at least about 50%, and most preferably at least about 80%.

Moreover, the preferred low calorie fat materials are sufficiently viscous and stable even at relatively low levels of solids. The Solid Fat Content (SFC) provides a reasonable approximation of the percent by weight solids of a particular fatty material at a given temperature. The present fat materials have a Solid Fat Content at 98.6° F. (37° C.) of not more than about 30%, and preferably not more than about 20%. Particularly preferred SFC values at 98.6° F. (37° C.) are in the range of from about 4 to about 20%, and most preferably in the range of from about 8 to about 14%.

Iodine Value is a measure of the degree of unsaturation of fatty acids. The low calorie fat materials preferably have an Iodine Value of from about 30 to about 70. These preferred low calorie fat materials typically have Iodine Values of from about 40 to about 60.

The low calorie fat materials can be any of a variety of edible, wholly or partially nondigestible compounds. Preferably, the low calorie fat material is selected from the group consisting of polyol fatty acid polyesters and polycarboxylic acids esterified with fatty alcohols, and mixtures thereof. Preferred polyol fatty acid polyesters are sugar fatty acid polyesters, sugar alcohol fatty acid polyesters, and polyglycerol fatty acid polyesters, and mixtures thereof. More preferably, the low calorie fat material is selected from the group consisting of sugar fatty acid polyesters and sugar alcohol fatty acid polyesters, and mixtures thereof, the sugars and sugar alcohols containing from 4 to 8 hydroxyl groups prior to esterification.

Sugar or sugar alcohol fatty acid polyesters comprise sugars, or sugar alcohols, that are esterified with fatty acids. The term "sugar" is used herein in its conventional sense as generic to monosaccharides, disaccharides, oligosaccharides, and polysaccharides. The term sugar alcohol" is also used in its conventional sense as generic to the reduction product of sugars wherein the aldehyde or ketone group has been reduced to an alcohol. These sugars and sugar alcohols contain at least 4 hydroxy groups prior to esterification, and preferably from 4 to 8 hydroxy groups. The fatty acid ester compounds are prepared by reacting a sugar or sugar alcohol with fatty acids as discussed below.

Examples of suitable monosaccharides are those containing 4 hydroxyl groups such as xylose, arabinose, and ribose; the sugar alcohol derived from xylose, i.e., xylitol, is also suitable. The monosaccharide erythrose is not suitable since it only contains 3 hydroxyl groups; however, the sugar alcohol derived from erythrose, i.e. erythritol, contains 4 hydroxyl groups and is thus suitable. Among 5 hydroxyl-containing monosaccharides that are suitable for use herein are glucose, mannose, galactose, fructose, and sorbose. A sugar alcohol derived from sucrose, glucose, or sorbose, e.g., sorbitol, contains 6 hydroxyl groups and is also suitable as the alcohol moiety of the fatty acid ester compound. Examples of suitable disaccharides are maltose, lactose, and sucrose, all of which contain 8 hydroxyl groups.

In preparing sugar or sugar alcohol fatty acid polyesters of the present invention a sugar or sugar alcohol compound such as those identified above are esterified with fatty acids having from 2 to about 24 (preferably from about 8 to about 22), carbon atoms. Examples of such fatty acids are acetic, butyric, caproic, caprylic, capric, lauric, myristic, myristoleic, palmitic, palmitoleic, stearic, oleic, elaidic, ricinoleic, linoleic, linolenic, eleostearic, arachidic, behenic, and erucic. The fatty acids can be derived from suitable naturally occurring or synthetic fatty acids and can be saturated or unsaturated, including positional and geometric isomers. The fat materials of this invention are usually, but not necessarily, mixed esters of fatty acids, rather than esters of a single type of fatty acid.

Fatty acids per se or naturally occurring fats and oils can serve as the source for the fatty acid portion of the sugar or sugar alcohol fatty acid ester. For example, rapeseed oil provides a good source for $C_{22}$ fatty acid. $C_{16}$–$C_{18}$ fatty acids can be provided by tallow, soybean oil, or cottonseed oil. Shorter chain fatty acids (e.g., $C_{12}$-$C_{14}$ fatty acids) can be provided by coconut, palm kernel, or babassu oils. Corn oil, lard, olive oil, palm oil, peanut oil, safflower seed oil, sesame seed oil, and sunflower seed oil, are examples of other natural oils which can serve as the source of the fatty acid component. The fatty acids can be saturated, unsaturated, or mixtures thereof. The unsaturated fatty acids can include positional and geometric isomers (e.g., cis and trans isomers), or mixtures thereof. In order to provide the required physical properties, the sucrose fatty acid polyesters are preferably esterified with particular kinds of fatty acids. Preferably, at least about 70% of the fatty acids are selected from the group consisting of lauric, myristic, palmitic, stearic, oleic and elaidic ($C_{18:1}$), linoleic ($C_{18:2}$), and behenic acids and mixtures thereof.

The sugar or sugar alcohol fatty acid polyesters suitable for use herein can be prepared by a variety of methods well known to those skilled in the art. These methods include: transesterification of the sugar or sugar alcohol with methyl, ethyl or glycerol fatty acid esters using a variety of catalysts; acylation of the sugar or sugar alcohol with a fatty acid chloride; acylation of the sugar or sugar alcohol with a fatty acid anhydride; and acylation of the sugar or sugar alcohol with a fatty acid, per se. As an example, the preparation of sugar and sugar alcohol fatty acid esters is described in U.S. Pat. Nos. 2,831,854, 3,963,699, 4,517,360, and 4,518,772, all of which are incorporated by reference.

A characterizing feature of the sugar or sugar alcohol fatty acid polyesters useful in the fat component of the present invention is that they predominantly contain at least 4 fatty acid polyester groups. Sugar or sugar alcohol fatty acid polyester compounds that contain 3 or less fatty acid ester groups are digested in the intestinal tract much in the manner as ordinary triglyceride fats, but sugar or sugar alcohol fatty acid polyester compounds that contain four or more fatty acid ester groups are digested to a lesser extent and thus have the desired low calorie properties.

Highly preferred low calorie fat materials are sucrose fatty acid polyesters. Preferred sucrose fatty acid polyesters have the majority of their hydroxyl groups esterified with fatty acids. Preferably at least about 85%, and most preferably at least about 95%, of the sucrose fatty acid polyesters are selected from the group consisting of octaesters, heptaesters and hexaesters, and mixtures thereof. Preferably, no more than about 35% of the esters are hexaesters or heptaesters, and at least about 60% of the esters are octaesters. Most preferably at least about 70% of the esters are octaesters. It is also most preferred that the polyesters have a total content of penta- and lower esters of not more than about 3%.

Polyglycerol fatty acid polyesters can also be used as low calorie fat materials in the present invention. Polyglycerol is prepared by the polymerization of glycerine in the presence of either acid or base. The polyglycerols can contain from 2 to 20 glycerol moieties. Preferably, the polyglycerols will be those having from 2 to 15 glycerol moieties.

The polyglycerol compounds can be made by any synthetic method. See, for example, U.S. Pat. No. 3,968,169 to Seiden and Martin (1976). Esterification of the polyglycerols can also be done by any method known to the art, providing the resulting polyglycerol esters have the required rheological properties.

The "polycarboxylic acids esterified with fatty alcohols" are tricarboxylic and tetracarboxylic acids and higher. The polycarboxylic acids can be partially or wholly esterified with fatty alcohols. At least three fatty alcohol ester groups must be on an acid molecule to make it partially nondigestible.

Source oils particularly suitable for use in preparing these preferred polyol polyesters include hardened and partially hardened canola, corn, safflower, high oleic safflower, soybean, peanut, sunflower or high oleic sunflower oils. Mixtures of these oils are also suitable. See U.S. patent application Ser. No. 421,867, to Robert W. Johnston, Josephine L. Kong-Chan, Richard G. Schafermeyer and Paul Seiden, filed Oct. 16, 1989 (herein incorporated by reference), which discloses these preferred polyol polyesters and their preparation.

The fat component of the present invention can also be fortified with vitamins and minerals, particularly the fat-soluble vitamins, including β-carotene, U.S. Pat. No. 4,034,083 to Mattson discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones. The naturally occurring fat-soluble vitamins are $K_1$ (phylloquinone), $K_2$ (menaquinone), and $K_3$ (menadione). The amount of the fat-soluble vitamins employed herein to fortify the present fat component can vary. If desired, the fat component can be fortified with a recommended dietary allowance (RDA), or increment or multiple of an RDA, of any of the fat-soluble vitamins or combinations thereof. It is preferred that the fat component be supplemented with 0.88 to 1.1 mg. vitamin E in the form of d-alpha-tocopherol acetate per gram of sucrose polyesters.

Vitamins that are nonsoluble in fat can similarly be included in the fat materials. Among these vitamins are the vitamin B complex vitamins, vitamin C, vitamin G, vitamin H, and vitamin P. The minerals include the wide variety of minerals known to be useful in the diet, such as copper, magnesium, manganese and zinc. Any combination of vitamins and minerals can be used in the present fat component.

C. Thickening Component

A particularly important ingredient of this thickener is selected from starches, edible gums, and mixtures of these materials. Suitable edible gums for use herein include xanthan gum, gum acacia, carob bean gum, guar gum, gum karaya, gum tragacanth, carrageenan, locust bean gum, pectin, alginic acid, as well as the respective sodium and calcium salts and 1,2-propylene glycol esters of alginic acid, various cellulose derivatives such as carboxymethyl-cellulose, carboxyethylcellulose, hydroxypropylcellulose, methylcellulose and microcrystalline cellulose, as well as mixtures of these edible gums. Suitable starches for use herein include food starch, modified food starch, wheat flour, rye flour, potato flour, as well as combinations of these starches. Gums, agar, carrageenans, alignate, pectin, and psyllium, can also be used. Gums include xanthan, guar and locust bean gum. Preferred thickeners for use in salad dressing paste components of the present invention are food starch and modified food starch, and especially combinations of food starch and modified food starch.

The particular amount of thickener included in the emulsified oil dressing product is highly dependent upon whether it is an edible gum or a starch. In the case of starches, the thickener comprises from about 2 to about 5% of the product. Preferably, starch comprises from about 2 to about 3% of the product. Edible gum thickeners are typically present at lower levels.

The thickener is usually dispersed in oil to prevent hydration before the emulsion is formed. It can also be mixed with water to make a salad dressing paste. The amount of water included in the salad dressing paste component depends on the particular consistency and texture desired in the product. Usually, water comprises from about 25 to about 35% of the product. Preferably, water comprises from about 27 to about 33% of the product. The formation of the paste in water is not preferred when making calcium fortified sauces.

When a protein is used with CCM, a gel is formed which then does not require a thickener. A thickener can be added.

D. Acid/Acidifying Component

An acid/acidifying component is also included in emulsified oil dressing products. Suitable acidifying ingredients include vinegar or any vinegar diluted with water such as cider vinegar and white vinegar, lemon juice and/or lime juice, citric and/or malic acid, and mixtures of these acidifying ingredients. Lemon juice, lime juice, citric acid and malic acid are typically used in combination with vinegar as the acidifying component. Usually, the acid/acidifying component comprises from about 3% to about 12% of the emulsified oil dressing product. Preferably, the acidifying component comprises from about 3% to about 5% of the product. The acetic acid level is typically 10% of vinegar, therefore, the acetic acid level in dressing is from 0.015% to 0.25%. The acidifying component must be present in sufficient amount to lower the pH of the dressing to from about 3.5 to about 4.5. This is particularly important when neutral CCMs are used.

Vinegars can be natural vinegars made by fermentation of juices to form acetic acid as for example, apple cider vinegar and red wine vinegar. Acetic acid can also be added to water and flavored to produce a vinegar taste. A vinegar fortified with calcium citrate malate that can be used herein contains from about 1.0% to about 10% (100 grain vinegar) acetic acid, from about 0.001% to 0.5% flavor, from about 0.5% to about 10% metastable calcium citrate malate and the remainder is water.

E. Optional Ingredients

The salad dressing paste component can comprise other optional, but desirable, ingredients. One of these ingredients is a nutritive carbohydrate sweetener or sweeteners. Suitable nutritive sweeteners include sucrose, glucose, fructose, maltose, high fructose corn syrups, and high maltose corn syrups. The amount of nutritive sweetener included is selected to provide the desired sweetness intensity in the emulsified oil dressing product. Usually, the nutritive sweetener comprises from about 0.5 to about 5% of the product. Preferably, the nutritive sweetener comprises from about 0.5 to about 2.5% of the product.

If an extra calorie reduction benefit is desired, noncaloric or reduced calorie sweeteners can be used wholly or partially in place of the nutritive carbohydrate sweetener. Suitable noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucralose, miraculin; monellin; sorbitol; xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alpha-aminodicarboxylic acids and gem-diamines; and 3-hydroxy-4-alkyloxyphenyl aliphatic carboxylates or heterocyclic aromatic carboxylates. The particular amount of noncaloric or reduced sweetener included in the salad dressing paste component will depend on the sweetness intensity of the particular sweetener and the sweetness effect desired. Generally from 0.1 to 1% is used of an non caloric or reduced calorie sweetener.

Another desirable optional ingredient present in the salad dressing component is a sequestrant(s). Suitable sequestrants include, but are not limited to, calcium disodium ethylene diamine tetraacetate (EDTA), and disodium EDTA. These sequestrants are typically included in salad dressing paste components to preserve the color and/or flavor of the emulsified oil dressing product. These sequestrants are typically included in an amount of from about 0.004 to about 0.006% of the product.

Other ingredients typically included in the salad dressing paste components are salt, preservatives and spices/flavorants. Suitable preservatives include sodium and potassium benzoate. Suitable spices and flavorants include mustard powder, onion powder, garlic powder, oleoresin paprika, oil of clary sage, and egg flavors. The salt, preservatives and spices/flavorants are included in amounts to provide the saltiness, preservative properties and flavor/aroma properties desired. If desired, bulking agents such as maltodextrins or polydextrose can be included in appropriate amounts in the salad dressing paste component.

In addition, the emulsified oil dressing products of the present invention include other components typically present in salad dressing products. For example, an egg yolk component is typically included in such products. This egg yolk component can comprise liquid egg yolks, frozen egg yolks, dried egg yolks, liquid whole eggs, frozen whole eggs, sugared frozen egg yolks, salted frozen egg yolks, dried whole eggs, or combinations of the foregoing egg yolk ingredients. This egg yolk component usually comprises from about 5 to about 15% of the emulsified oil dressing product. Preferably, this egg yolk component comprises from about 11 to about 13% of the product. The egg yolk component contains protein, which as noted above, forms a gel with the calcium citrate malate and therefore the thickener level needs to be adjusted.

Other optional components typically present in emulsified oil dressing products include crystallization inhibitors such as, but not limited to, oxystearin, lecithin, lower sucrose esters of fatty acids (i.e., sucrose mono-, di- or tri- esters), and polyglycerol esters of fatty acids, and monosodium glutamate. These optional components can be included in the emulsified oil dressing products in amounts typically used for salad dressing products.

F. Preparation of Emulsified Oil Dressing Product

The emulsified oil dressing products of the present invention can be prepared generally by any standard method for preparing conventional salad dressing products. For example, the calcium citrate malate (CCM) or calcium acetate can be added to the water portion or the oil portion of the sauce. If the CCM is added to the water portion of the sauce, it should be beat with the wire whisk to avoid clumping of the calcium containing powder. Clumping is avoided if calcium citrate malate complex or calcium acetate is dispersed in the oil.

CCM can be prepared in-situ or added to sauce as a powder. If 6:2:3 is prepared using calcium carbonate or calcium hydroxide an addition of 0.1% citric acid is needed to reach a desirable pH for the final product. If 6:2:3 is prepared using a combination of calcium chloride, calcium sulfate and calcium carbonate a pH well below the specifications can be obtained. The preferred calcium content is in the range of from 12% to 22%.

For example, the salad dressing paste component is prepared by mixing together the thickener and water, heating this mixture to a temperature of from about 190° to about 200° F. to cook the paste component, and then adding the remaining paste ingredients (e.g., sweetener, sequestrant, salt, preservative, spices/flavorants). The egg yolk ingredients are added to this cooked salad dressing paste component and then mixed. The fat material low calorie fats or triglyceride oil and any crystallization inhibitor are then added to this cooked paste component/egg yolk mixture. (It is sometimes necessary to premelt the materials and crystallization inhibitor prior to addition). After the fat and/or oil and crystallization inhibitor have been mixed in, the acidifying ingredients (e.g. vinegar(s), and lemon juice) are added and mixed in. The resulting emulsified oil dressing product can then be packaged in an appropriate container and stored at ambient temperatures. Preferably, the preparation of the emulsified oil dressing products of the present invention is conducted under an inert atmosphere (e.g. nitrogen).

EXAMPLE I

| Preparation of Calcium Citrate Malate | |
|---|---|
| Materials | Amount (g) |
| Calcium Carbonate (99+ % purity) | 300 |
| Citric Acid (Anhydrous, powder) | 192 |
| Malic Acid (DL, practical) | 201 |
| Distilled/Deionized Water | 1000 |

Procedure

To prepare about 500 grams of CCM (6:2:3) powder:

Dissolve 192 g of citric acid and 201 g of malic acid in 1000 ml of distilled-deionized water in a 2 liter glass beaker and stir with a teflon coated magnetic stir bar until solution is clear (about 5 minutes). Carefully add 300 g of $CaCO_3$ to the acids solution at ambient temperature. This solid is added quickly, but at a rate slow enough to control the carbon dioxide evolution and to avoid overflowing the beaker. The mixture is stirred for 3 hours at room temperature. After 3 hours, the mixture is transferred in total to a 12 inch by 16 inch stainless tray to yield a solution fill level of approximately 0.5–0.75 inch. The mixture is dried in an 80° C. forced air oven (model Blue-M Stabil-Therm) for 19 hours.

The tray is removed and allowed to cool to room temperature. The particle size of the CCM solid is ground to pass through a #20 screen (84 microns) with a Wiley mill.

Store the calcium citrate malate solid in a cool, dry place to avoid increasing the level of hydration. The calcium level of the product is 20.73%.

EXAMPLE II

A metastable 6:2:3 calcium citrate malate is prepared as in Example I except that the material is freeze dried at a temperature of 25° C. and a vacuum 0.01 millimeters of mercury.

EXAMPLE III

| Ingredient | Amount (grams) |
|---|---|
| Citric Acid | 5.8 |
| Malic Acid | 6.1 |
| Vinegar (100 grain) | 33 |
| Water | 67.1 |
| Calcium Carbonate | 9.1 |

A vinegar containing calcium citrate malate in a molar ratio of 6:2:3 is prepared by first dissolving the citric and malic acid in the vinegar and water. The calcium carbonate is added to this and stirred for one hour at room temperature.

EXAMPLE IV

| Ingredient | Amount (grams) |
| --- | --- |
| Dried Egg White Solids | 2.25 |
| Deionized Distilled Water | 150.25 |
| Salt (Sodium Chloride) | 2.6 |
| Sugar (Sucrose) | 11.35 |
| CCM (6:2:3) | 18.18 |
| Xanthan Gum | 1.37 |
| Canola Oil | 111.9 |
| Vinegar (10% acetic acid, white) | 19.3 |

The egg white solids, salt, sugar, water and CCM are combined in a bowl and beat with a wire whisk until all ingredients are well mixed. The xanthan gum and pregelatinized starch are dispersed in the oil. This oil mix and the vinegar are added to the water mixture while whipping on high in a Hobart mixer with wire attachment. This whipping is continued for two minutes after all ingredients have been added.

Pickle relish can be added to this sauce to make a tartar sauce. Other herbs and spices can be added to make a vegetable dip, e.g. garlic, basil, oregano, rosemary, onion and pepper.

Other vegetable oils can be substituted for the canola oil, e.g. soybean oil, corn oil, partially hydrogenated soybean oil or sunflowerseed oil.

EXAMPLE V

| Ingredients | Amounts (grams) |
| --- | --- |
| Evaporated Milk | 111.96 |
| Salt (sodium chloride) | 2.84 |
| Mustard | 6.28 |
| CCM (6:2:3) | 20.2 |
| Sugar (sucrose) | 11.35 |
| Xanthan Gum | 0.46 |
| Vegetable Oil | 189.68 |
| Vinegar (5% white vinegar) | 26.44 |
| Paprika | 0.001 |

The evaporated milk, CCM, salt, mustard and sugar are combined in a bowl and beat with a wire whisk until all ingredients are well mixed. The xanthan gum is dispersed in vegetable oil and then the oil is slowly added to the milk mixture with constant beating. The vinegar is added while mixing on high in a Hobart mixer with wire whisk attachment. The mixture is whipped on high for 2 minutes more.

The CCM can be prepared by combining a portion of the water in the formula with the entire amount of vinegar in the formula. Next the acids are dissolved in the vinegar/water system. If sugar is used in the formula it is added at the time (the overall effect of adding sugar at this time is a smoother sauce); the calcium source is then added. The mixture is stirred for one hour. The sauce is prepared by using the CCM mixture as the vinegar.

EXAMPLE VI

A low calorie salad dressing product according to the present invention was prepared from the following ingredients:

| Ingredient | Percent |
| --- | --- |
| Paste Component | (38.7300) |
| Water | 29.6260 |
| Maltrin M100* | 3.5203 |
| Purity 420A starch | 1.9892 |
| Salt | 1.4243 |
| Melojel-90 starch | 0.7957 |
| Sucrose | 0.7957 |
| Mustard seed | 0.3978 |
| Sodium benzoate | 0.0756 |
| Artificial egg flavor | 0.0354 |
| Garlic powder | 0.0318 |
| Onion powder | 0.0318 |
| EDTA | 0.0048 |
| Oleoresin paprika | 0.0012 |
| Oil clary sage | 0.0004 |
| Fat Component | (45.0000) |
| Low calorie fat material | 30.0000 |
| Canola oil | 15.0000 |
| 10% sugared egg yolks | 11.5 |
| Caprol E.T.** | 0.1000 |
| Vitamin E | 0.0330 |
| 50 grain cider vinegar | 0.5000 |
| 110 grain distilled vinegar | 2.9200 |
| Lemon juice | 0.75 |
| Calcium Citrate Malate | 0.500 |

*Low DE maltodextrin
**Polyglycerol ester crystallization inhibitor.

The low calorie fat material is a sucrose polyester composition made by esterifying sucrose with a mixture of methyl esters derived from a 45/55 blend of touch-hardened soybean oil (I.V. 107) and fully hydrogenated soybean oil (I.V. 8). This composition has the following physical and chemical properties:

| | |
| --- | --- |
| Viscosity (100° F., 37.8° C.) | 42.9 poise |
| Liquid/Solid Stability (100°, 37.8° C.) | 100% |
| SFC (98.6° F., 37° C.) | 12.6% |
| I.V. | 46.5 |
| FAC | |
| $C_{16:0}$ | 9.6% |
| $C_{18:0}$ | 52.7% |
| $C_{18:1}$ | 21.3% |
| $C_{18:2}$ | 14.7% |
| $C_{18:3}$ | 1.0% |
| $C_{20:0}$ | 0.5% |
| $C_{22:0}$ | 0.2% |
| Esters | |
| Octa | 82.1% |
| Hepta | 17.9% |

All of the paste ingredients are slurried in a steam jacketed kettle. The contents of the kettle are heated to a temperature of 90° F. (87.8° C.) and then held at this temperature for 10 minutes. Water is added to this cooked paste to replace the water which has been lost during heating. This cooked paste is added to an Abbee' mixer and the scraper blades are started. Egg yolks are added to the mixer and the resulting mixture sheared for 15 seconds. The low calorie fat material and Caprol E.T. (preheated to 160° F. (71.1° C.)), as well as the canola oil, are slowly added with mixing and then the resulting mixture are sheared for 15 seconds. Next, the vinegars and lemon juice, and calcium citrate malate are added to the contents of the mixer. The resulting mixture are shear mixed for 1½ minutes at a temperature of 110° F. (43.3° C.). The resulting salad dressing product is discharged from the mixer, filled into quart jars, capped and is stored at a temperature of 70° F. (21.1° C.).

EXAMPLE VII

A salad dressing product is prepared similar to Example V, but using as a low calorie fat material a sucrose polyester composition made by esterifying sucrose with a mixture of methyl esters derived from a 70/30 blend of partially hardened soybean oil (I.V. 80-85) and fully hydrogenated soybean oil (I.V. 1-8). This composition has the following physical and chemical properties:

| | |
|---|---|
| Viscosity (100° F., 37.8° C.) | 59.0 poise |
| Liquid/Solid Stability (100°, 37.8° C.) | 98% |
| SFC (98.6° F., 37° C.) | 11.6% |
| I V. | 46.5 |
| FAC | |
| $C_{14:0}$ or lower | 0.7% |
| $C_{16:0}$ | 9.9% |
| $C_{17:0}$ | 0.2% |
| $C_{18:0}$ | 51.5% |
| $C_{18:1}$ | 29.8% |
| $C_{18:2}$ | 7.8% |
| $C_{18:3}$ | —% |
| $C_{20:0}$ | —% |
| $C_{22:0}$ | —% |
| Trans-fatty acids | 9.7% |
| Percent trans-double bonds | 21.4% |
| Esters | |
| Octa | 92.1% |
| Hepta | 7.9% |

What is claimed is:

1. An emulsified oil dressing product, which is spreadable and which comprises:
    a. from about 30 to about 65% of a fat component;
    b. from about 0.5 to about 10% of a thickener selected from the group consisting of starches, edible gums, and mixtures thereof;
    c. sufficient acid component to lower the pH to 3.5 to 4.5 and
    d. from about 0.5% to about 10% of a calcium source selected from the group of calcium citrate malate metastable complexes wherein the mole ratio of calcium is from 1 to 8, the mole ratio of citrate is from 1 to 6 and the mole ratio of malic is from 1 to 6, calcium and mixtures thereof, and i.e. the balance being water.

2. The product of claim 1 wherein said thickener comprises from about 2 to about 5% of the product and is selected from the group consisting of food starch, modified food starch, tapioca flour, wheat flour, rye flour, potato flour, gums, carrageenan, and fibers and mixtures thereof.

3. The product of claim 2 wherein said thickener further comprises a nutritive carbohydrate sweetener in an amount of from about 0.5 to about 5% of the product.

4. The product of claim 3 comprises from about 3 to about 12% of an acidifying component and from about 5% to about 15% egg yolk emulsifier.

5. A product according to claim 4 wherein the molar ratios of calcium is from 4 to 8, of citrate is from 1 to 3 and the molar ratio of malic acid is from 1 to 5.

6. A product according to claim 5 wherein the mole ratio of calcium is from 4 to 8 and wherein said product is neutral.

7. The product of claim 6 wherein said fat component comprises from about 40 to about 50% of the product.

8. The product of claim 7 wherein said triglyceride oil is selected from the group consisting of cottonseed oil, soybean oil, safflower oil, corn oil, olive oil, coconut oil, peanut oil, rapeseed oil, canola oil, sesame seed oil, rice bean oil, sunflower seed oil and mixtures thereof.

9. A product according to claim 8 wherein said acidifying agent is selected from the group consisting of acetic acid, citric acid, malic acid, lemon juice and natural vinegar.

10. A product according to claim 9 wherein said acidifying agent is lemon juice.

11. A salad dressing product, which is pourable and which comprises:
    a. from about 40 to about 50% of a fat component comprising:
        1. from about 60 to about 70% of the fat component of an edible, wholly or partially nondigestible sucrose fatty acid polyester having at least 4 fatty acid ester groups, each fatty acid ester group containing 8 to 22 carbon atoms, said sucrose polyester having:
            (a) a viscosity of from about 10 to about 50 poise at 100° F. (37.8° C.) and at a shear rate of 10 seconds$^{-1}$;
            (b) a liquid/solid stability of at least about 90% at 100° F. (37.8° C.); and
            (c) a Solid Fat Content of from about 8 to about 14% at 98.6° F. (37° C.); and
        2. from about 30 to about 40% of the fat component of a triglyceride oil;
    b. from about 35 to about 45% of the product of a salad dressing paste component comprising:
        1. from about 2 to about 5% of the product of a thickener selected from the group consisting of food starch, modified food starch, tapioca flour, wheat flour, rye flour, potato flour, and mixtures thereof;
        2. from about 25 to about 35% of the product of water; and p2 3. from about 0.5 to about 2.5% of the product of a nutritive carbohydrate sweetener;
    c. from about 5 to about 15% of the product of an egg yolk component;
    d. from about 3 to about 12% of the product of an acidifying component and
    e. from about 0.5% to about 10% of a calcium source selected from group of calcium citrate malate metastable complexes wherein the mole ratio of calcium is from 1 to 8, the mole ratio of citrate is 1 to 6 and the mole ratio of malic is 1 to 6, calcium acetate and mixtures thereof.

12. The product of claim 11 wherein said thickener comprises from about 2 to about 3% of the product and is selected from the group consisting of food starch and modified food starch.

13. The product of claim 12 wherein said egg yolk component comprises from about 11 to about 13% of the product and wherein said acidifying component comprises from about 3 to about 5% of the product.

14. The product of claim 13 wherein said nutritive sweetener is selected from the group consisting of sucrose, glucose, fructose, maltose, high fructose corn syrups and high maltose corn syrups.

15. The product of claim 14 wherein said triglyceride oil is selected from the group consisting of cottonseed oil, soybean oil, safflower oil, corn oil, olive oil, coconut oil, peanut oil, rapeseed oil, canola oil, sesame seed oil, sunflower seed oil and mixtures thereof.

16. The product of claim 15 wherein said sucrose polyester comprises at least about 70% fatty acids selected from the group consisting of lauric, myristic, palmitic, stearic, $C_{18:1}$, $C_{18:2}$ and behenic acids, and mixtures thereof.

17. The product of claim 16 wherein said sucrose polyester comprises at least about 70% octaester.

18. A dressing according to claim 11 wherein said calcium is calcium acetate.

19. A calcium fortified vinegar comprising:
a) from about 1% to about 12% acetic acid;
b) from about 0.001% to about 1% flavor;
c) from about 0.05% to about 10% of a calcium source selected from the group of calcium citrate malate metastable complexes wherein the mole ratio of calcium is from 1 to 8, the mole ratio of citrate is from 1 to 6 and the mole ratio of malic is from 1 to 6, calcium acetate and mixtures thereof; and
d) from about 83% to about 98.5% water.

20. A vinegar according to claim 19 wherein the vinegar is prepared by fermentation of apple or grape juice.

21. A vinegar according to claim 19 wherein the molar ratio of calcium to citrate to malate is 4:2:3.

22. A vinegar according to claim 21 wherein the calcium citrate malate is neutral as determined by the equation $2x=2y+3z$ wherein x is moles of calcium, y=moles of citric acid and z moles of malic acid and wherein x=3 or more.

23. A vinegar according to claim 19 wherein the calcium citrate malate is neutral as determined by the equation $2x=2y+3z$ wherein x is moles of calcium, y=moles of citric acid and z moles of malic acid and wherein x TM 3 or more.

24. A vinegar according to claim 19 wherein said calcium is calcium acetate.

25. An emulsified oil dressing comprising:
a) from about 0.5% to about 0% of a calcium source selected from the group consisting of calcium citrate malate wherein the mole ratio of calcium is from 1 to 8 and the mole ratio of citrate is from 1 to 3 and the mole ratio of malate ranges from 1 to 5, calcium acetate and mixtures thereof;
b) a sufficient amount of an acidic acid component to lower the pH to from about 3.5 to about 4.5;
c) from about 0.5% to about 10% of a protein; and
d) from about 5% to about 60% fat; and
e) the balance being water.

26. A dressing according to claim 11 wherein said calcium is calcium acetate.

* * * * *

UNITED STATES PATENT AND TRADEMARK OFFICE
CERTIFICATE OF CORRECTION

PATENT NO. : 5,215,769
DATED : June 1, 1993
INVENTOR(S) : Mary M. Fox et al.

It is certified that error appears in the above-indentified patent and that said Letters Patent is hereby corrected as shown below:

On the title page, item [75], Inventors, add --Rose Ann Dabek--.

Signed and Sealed this

Eleventh Day of June, 1996

Attest:

BRUCE LEHMAN

*Attesting Officer*  *Commissioner of Patents and Trademarks*